United States Patent
Rakus et al.

(10) Patent No.: US 11,227,729 B1
(45) Date of Patent: Jan. 18, 2022

(54) MAGNETORHEOLOGICAL FLUID DAMPING WITH VARIABLE VISCOSITY FOR CIRCUIT INTERRUPTER ACTUATOR

(71) Applicant: EATON INTELLIGENT POWER LIMITED, Dublin (IE)

(72) Inventors: Paul R. Rakus, Coraopolis, PA (US); Hongbin Wang, Novi, MI (US); Logan D. Weigle, McKees Rocks, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/087,880

(22) Filed: Nov. 3, 2020

(51) Int. Cl.
*H01H 3/60* (2006.01)

(52) U.S. Cl.
CPC .................. *H01H 3/605* (2013.01)

(58) Field of Classification Search
CPC .......... H01H 3/605; H01H 33/30; F16F 9/535
See application file for complete search history.

(56) References Cited

U.S. PATENT DOCUMENTS

| | | | | |
|---|---|---|---|---|
| 4,535,208 A | * | 8/1985 | Wallimann | H01H 3/30 200/288 |
| 6,020,567 A | * | 2/2000 | Ishikawa | H01H 3/28 218/120 |
| 6,131,709 A | * | 10/2000 | Jolly | F16F 9/20 137/909 |
| 7,243,763 B2 | * | 7/2007 | Carlson | F16F 7/082 188/266.1 |
| 7,958,979 B2 | * | 6/2011 | Sekiya | F16F 9/535 188/267.2 |
| 8,912,871 B2 | * | 12/2014 | Lauraire | H01H 3/28 335/229 |
| 9,347,513 B2 | * | 5/2016 | Wu | F16F 9/443 |
| 9,508,514 B2 | * | 11/2016 | Ohda | H01F 7/122 |
| 9,947,448 B2 | * | 4/2018 | Kohlhafer | H01F 7/122 |
| 10,580,599 B1 | * | 3/2020 | Wang | H01H 33/285 |

\* cited by examiner

*Primary Examiner* — Vanessa Girardi
(74) *Attorney, Agent, or Firm* — Eckert Seamans Cherin & Mellott, LLC (57) ABSTRACT

A damping and latching mechanism for a Thomson coil-based actuator used to open and close the separable contacts of circuit interrupters in circuit breakers uses magnetorheological fluid to actively control the damping of opening and closing strokes in a circuit breaker in order to decrease wear and tear on components that can result from contact-based damping mechanisms and to maintain the open and closed states of separable contacts in the circuit breaker.

20 Claims, 3 Drawing Sheets

MAGNETORHEOLOGICAL FLUID DAMPING WITH VARIABLE VISCOSITY FOR CIRCUIT INTERRUPTER ACTUATOR

BACKGROUND

Field

The disclosed concept relates generally to high speed actuation mechanisms used to open and close separable contacts in circuit interrupters, and in particular, to damping and latching of such actuation mechanisms.

Background Information

Circuit interrupters, such as for example and without limitation, those used in circuit breakers, are typically used to protect electrical circuitry from damage due to an overcurrent condition, such as an overload condition, a short circuit, or another fault condition, such as an arc fault or a ground fault. Circuit interrupters typically include separable electrical contacts, which operate as a switch, and use either air, a vacuum, or other mediums such as sulfur hexafluoride ($SF_6$) as electrical insulation between the separable contacts. When the separable contacts are in contact with one another in a closed state, current is able to flow through any circuits connected to the circuit interrupter. When the separable contacts are not in contact with one another in an open state, current is prevented from flowing through any circuits connected to the circuit interrupter. The separable contacts may be operated either manually by way of an operator handle or automatically in response to a detected fault condition. Typically, a circuit breaker consists of a circuit interrupter, an actuation mechanism, and electrical sensing and drive circuits. The actuation mechanism includes an actuator designed to rapidly close or open the separable contacts, and a trip mechanism, such as a trip unit, which senses a number of fault conditions to trip the separable contacts open automatically using the actuator. Upon sensing a fault condition, the trip unit trips the actuator to move the separable contacts to their open position.

Some circuit interrupters such as those found in, for example, power circuit breakers, employ vacuum interrupters as the switching devices. The separable electrical contacts usually included in vacuum interrupters are generally disposed on the ends of corresponding electrodes within an insulating housing that forms a vacuum chamber. Typically, one of the contacts is fixed relative to both the housing and to an external electrical conductor, which is electrically interconnected with a power circuit associated with the vacuum interrupter. The other contact is part of a movable contact assembly including an electrode stem of circular cross-section and a contact disposed on one end of the electrode stem and enclosed within a vacuum chamber. A driving mechanism is disposed on the other end, external to the vacuum chamber. When the trip unit detects a fault condition, the trip unit trips the actuator to cause the driving mechanism to open the separable contacts within the vacuum chamber. After the fault condition has resolved, the trip unit signals the actuator to cause the driving mechanism to drive the separable contacts closed within the vacuum chamber.

In medium and high voltage electrical systems and DC power systems in particular, the actuator of the circuit breaker needs to be capable of driving the separable contacts open quickly in order to mitigate the effects of a fault condition. However, the force required to open the separable contacts quickly is significant and can potentially damage any components connected to the driving mechanism at the end of opening strokes. In addition, closing separable contacts quickly during closing strokes requires significant force which can also result in significant wear and tear on the separable contacts and any components connected to the driving mechanism, necessitating that the circuit interrupter be replaced when the separable contacts can no longer be relied upon to function properly.

There is thus a need for mechanisms to accurately control the force and motion of actuation mechanisms so that circuit interrupters can operate robustly and reliably over long periods of time and in harsh operation environments.

SUMMARY

These needs and others are met by embodiments of the disclosed concept in which a damping and latching mechanism for a circuit interrupter in a circuit breaker uses magnetorheological fluid to provide actively controlled damping of opening and closing strokes of the circuit interrupter and maintain the open and closed states of separable contacts in the circuit interrupter in accordance with standard safety and operation procedures.

In accordance with one aspect of the disclosed concept, a damping and latching mechanism for use with a movable separable contact of a circuit interrupter comprises: a housing; magnetorheological (MR) fluid contained within the housing, the MR fluid comprising ferromagnetic particles and carrier fluid; a piston disposed within the housing such that the piston is immersed in the MR fluid, the piston being structured to fit snugly within the housing and move within the housing, the piston comprising a number of channels through which the MR fluid can pass and an electromagnet electrically connected to a current source; and a connecting rod coupled at a first end to the piston and structured to couple the piston to the moving separable contact at a second end of the connecting rod, wherein supplying current from the current source to the electromagnet produces a magnetic field within the number of channels in the piston, and wherein changing the magnetic field changes the viscosity of the MR fluid.

In accordance with another aspect of the disclosed concept, a circuit breaker comprises: a circuit interrupter comprising a movable separable contact and a second separable contact; an actuator structured to move the movable separable contact; and a damping and latching mechanism, the damping and latching mechanism comprising: a housing; magnetorheological (MR) fluid contained within the housing, the MR fluid comprising ferromagnetic particles and carrier fluid; a piston disposed within the housing such that the piston is immersed in the MR fluid, the piston being structured to fit snugly within the housing and move within the housing, the piston comprising a number of channels through which the MR fluid can pass and an electromagnet electrically connected to a current source; and a connecting rod coupled at a first end to the piston and structured to couple the piston to the moving separable contact at a second end of the connecting rod, wherein supplying current from the current source to the electromagnet produces a magnetic field within the number of channels in the piston, and wherein changing the magnetic field changes the viscosity of the MR fluid.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As used herein, the singular form of "a", "an", and "the" include plural references unless the context clearly dictates otherwise.

As used herein, the term "passive damper" shall mean any mechanism used to damp the velocity of any components of a circuit interrupter that move in order to open, i.e., separate, the separable contacts of a circuit interrupter, wherein such mechanism achieves damping by making contact with and/or causing an impact with said moving components.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As employed herein, the term "processing unit" or "processor" shall mean a programmable analog and/or digital device that can store, retrieve, and process data; a microprocessor; a microcontroller; a microcomputer; a central processing unit; or any suitable processing device or apparatus.

Figure 1A:
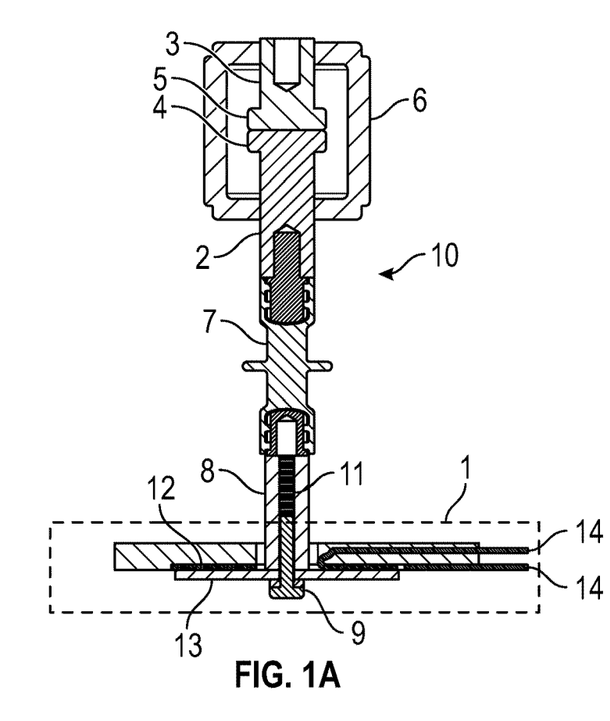
FIGS. 1A and 1B are diagrams of a fast Thomson coil actuator connected to a vacuum circuit interrupter.
Figure 1B:
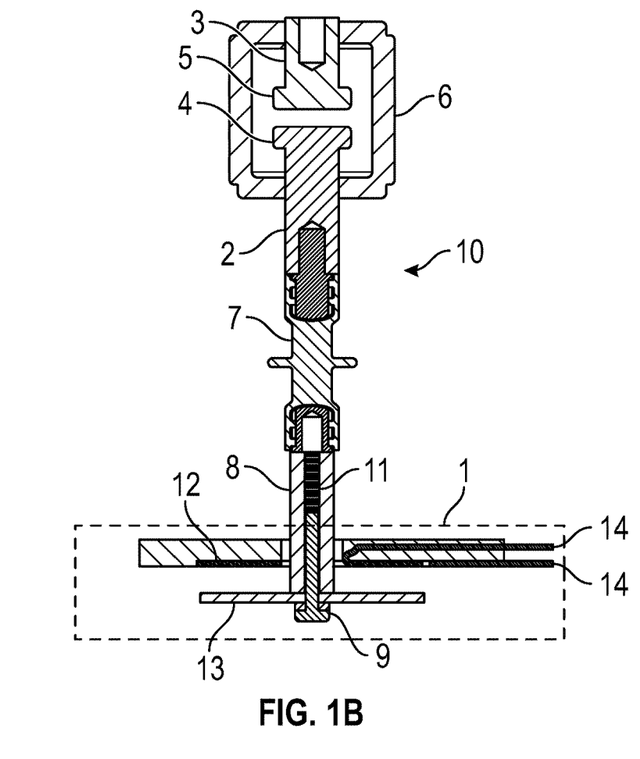

FIGS. 1A and 1B depict a circuit breaker that uses a fast Thomson coil actuator to drive a pair of separable contacts of a circuit interrupter between open and closed states. A moving assembly 10 comprises a moving stem 2, a drive rod assembly 7, an actuator shaft 8, a contact spring 11, and the moving components of a Thomson coil actuator 1, all coupled to one another as shown. The moving stem 2 includes a separable contact 4. A fixed stem 3 includes a separable contact 5. The separable contacts 4, 5 are enclosed within a vacuum housing 6. The fixed stem 3 is fixed relative to both the vacuum housing 6 and an external electrical conductor, which is electrically interconnected with a power circuit supplying power to the circuit interrupter. Drive rod assembly 7 comprises an insulating cover that shields Thomson coil actuator 1 from high voltage levels of the power circuit supplying power to the circuit interrupter. It will be appreciated that the setup shown in FIGS. 1A and 1B would be connected to one phase of power in a three-phase power system, such that three of the setups shown in FIGS. 1A and 1B would be used for a three-phase power system.

FIG. 1A depicts the separable contacts 4, 5 in a closed state, a state in which no fault condition is detected in the circuit breaker. In the closed state, the separable contacts 4, 5 are said to be closed and are disposed in contact with one another such that electric current can flow between the moving stem 2 and the fixed stem 3. In contrast, FIG. 1B depicts the separable contacts 4, 5 in an open state, a state that results from a trip unit (not shown) sensing a fault condition in the circuit breaker and causing Thomson coil actuator 1 to drive the moving assembly 10 (including moving stem 2 and separable contact 4) away from the fixed stem 3 and separable contact 5. In the open state, the separable contacts 4, 5 are said to be open and electric current is prevented from flowing between the moving stem 2 and fixed stem 3. A protrusion 9 extends from the bottom end (with respect to the view shown in FIGS. 1A and 1B) of actuator shaft 8. Many known circuit breaker systems include a latch on protrusion 9 that can engage with a latching assembly disposed underneath the moving assembly 10 to assist in maintaining the open state by keeping the moving assembly 10 separated from the fixed stem 3 until the fault condition is resolved. An opening stroke occurs when the moving assembly 10 moves from the closed state to the open state, and a closing stroke occurs when the moving assembly 10 moves from the open state to the closed state.

Thomson coil actuator 1 comprises a coil 12 and a conductive member 13. Coil 12 comprises a central opening through which actuator shaft 8 is disposed and is formed from a conductor wound into a coil that lies generally flat relative to a plane that is normal to the viewing plane of FIGS. 1A and 1B. Conductive member 13 may be produced from any electrically conductive material, and comprises a disc that lies generally flat relative to a plane that is normal to the viewing plane of FIGS. 1A and 1B. The arrangement of coil 12 and conductive member 13 depicted in FIGS. 1A and 1B is often referred to as a Thomson coil arrangement. Coil 12 is fixedly positioned relative to the space surrounding the circuit interrupter and is electrically connected, via conductors 14, to a current source (not shown) such that the current supplied to the coil 12 can be selectively adjusted and turned on and off by a processor (not shown). The conductive member 13 is fixedly coupled to the moving assembly 10 such that the exertion of upward or downward forces on the conductive member 13 causes corresponding upward or downward movement of the moving assembly 10.

Supplying a time-varying current to coil 12 creates a time-varying magnetic field that induces eddy currents in conductive member 13, and the eddy currents induced in conductive member 13 generate their own magnetic field. For example, when separable contacts 4, 5 are closed and an increasing current is supplied to coil 12, a magnetic flux generated by the current flowing through coil 12 induces eddy currents in conductive member 13 that in turn generate a magnetic flux oriented in opposition to the magnetic flux generated by the current through coil 12, repelling conductive member 13 away from coil 12 and initiating an opening stroke wherein moving assembly 10 moves away from fixed stem 3 and opens separable contacts 4, 5. In another example, when separable contacts 4, 5 are open and a decreasing current is supplied to coil 12, a magnetic flux generated by the current flowing through coil 12 induces eddy currents in conductive member 13 that generate a magnetic flux oriented in alignment with the magnetic flux generated by the current through coil 12, attracting conductive member 13 toward coil 12 and initiating a closing stroke wherein moving assembly 10 moves toward fixed stem 3 and closes separable contacts 4, 5.

A passive damper (not shown) such as a shock absorber or spring damper is typically included underneath (with respect to the view shown in FIGS. 1A and 1B) the Thomson coil actuator 1 in order to damp the velocity of an opening stroke as the moving assembly 10 approaches its final position in the open state. Damping occurs upon impact of the Thomson coil actuator 1, specifically protrusion 9, with the passive damper and quickly decreases the high initial velocity of the moving assembly 10 during an opening stroke. Contact spring 11 serves to damp the force with which moving assembly 10 closes separable contacts 4, 5 during a closing stroke.

Figure 2:
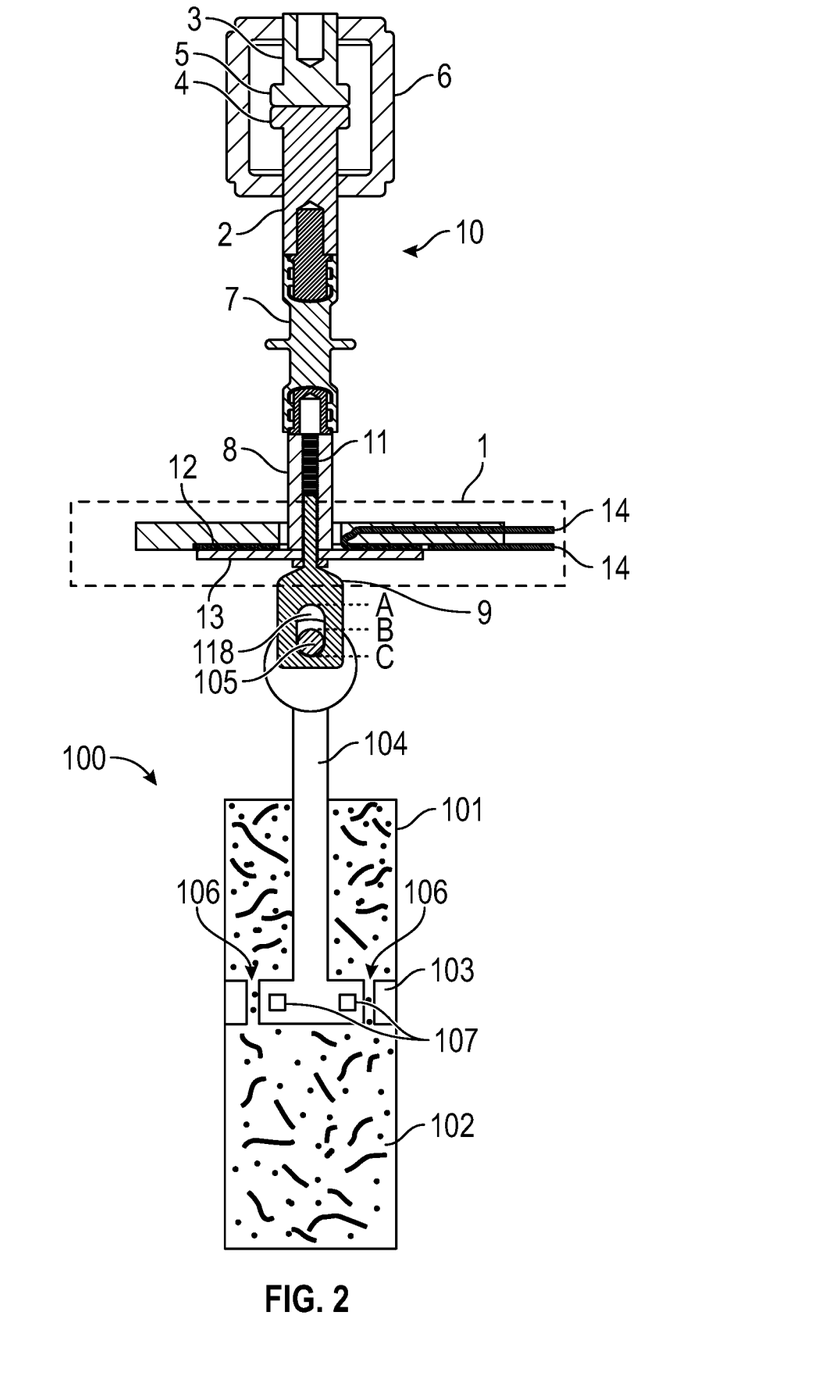
FIG. 2 is a diagram of a magnetorheological (MR) fluid damping and latching mechanism for use with a moving assembly of a circuit breaker in accordance with an example embodiment of the disclosed concept.

FIG. 2 shows a cross-sectional view of a magnetorheological (MR) fluid damping and latching system for use with a moving assembly of a circuit breaker, in accordance with an example embodiment of the disclosed concept. In one non-limiting example, the MR fluid damping system, MR damper 100, can be used to damp the movement of and latch a moving assembly such as moving assembly 10 shown in FIGS. 1A and 1B. While MR damper 100 is described herein as damping the movement of and latching moving assembly 10 for economy of disclosure, it will be appreciated that MR damper 100 can be used to damp the movement of and latch moving assemblies of circuit breakers with different configurations than the circuit breaker shown in FIGS. 1A and 1B without departing from the scope of the disclosed concept. Referring to FIG. 2, MR damper 100 comprises a housing 101, MR fluid 102, and a piston 103 and is connected to moving assembly 10 via a connecting rod 104 fastened to protrusion 9 via fastener 105, which is inserted into and coupled to an opening 118 in protrusion 9. Housing 101 is fixed in space and can be produced from any metal or plastic that has the mechanical strength and chemical stability to withstand the high voltage environment of a circuit breaker.

Housing 101 and piston 103 are constructed such that piston 103 fits snugly within housing 101 while retaining the ability to move in the axial direction (the vertical direction with respect to the view shown in FIG. 2) within housing 101. In the present disclosure, the use of the term "axial direction" or "axial dimension" with respect to housing 101 refers to the vertical direction within housing 101 with respect to the view shown in FIG. 2, and the use of the term "axial movement" with respect to housing 101 refers to movement in the vertical direction within housing 101 with respect to the view shown in FIG. 2.

Referring again to FIG. 2, in one non-limiting embodiment of the disclosed concept, housing 101 can be cylindrical such that each circular base of the cylinder is perpendicular to the viewing plane of FIG. 2 and the axis of the cylinder runs in the axial direction. In the same embodiment, piston 103 is also cylindrical such that each circular base of the cylinder is normal to the viewing plane of FIG. 2 and the axis of the cylinder runs in the axial direction, with the axis of piston 103 being shorter than the axis of housing 101. The circumference of piston 103 is slightly lesser than the circumference of housing 101 such that piston 103 fits snugly within housing 101 but is still able to move in the axial direction within housing 101. Provided that piston 103 fits snugly within housing 101 while retaining the ability to move within housing 101, housing 101 and piston 103 can take non-cylindrical forms without departing from the scope of the disclosed concept. For example and without limitation, housing 101 and piston 103 can be produced as polygonal prisms whose bases lie in planes normal to the viewing plane of FIG. 2, with piston 103 being shorter than housing 101 in the axial dimension.

Piston 103 includes a number of channels 106 through which MR fluid 102 can pass. Piston 103 can only move in the axial direction within housing 101 when MR fluid 102 is passing through channels 106, as piston 103 fits snugly enough within housing 101 such that there is no gap between the outer curved surface of piston 103 and the inner curved wall of housing 101 through which MR fluid 102 can pass in the axial direction. Conversely, piston 103 remains stationary with respect to housing 101 when MR fluid 102 is not passing through channels 106.

MR fluid typically comprises ferromagnetic sphere or ellipsoid particles on the scale of micrometers or nanometers suspended in a carrier fluid, typically oil. When MR fluid is not under the influence of a magnetic field, the ferromagnetic particles are randomly dispersed and suspended throughout the fluid. Applying a magnetic field across the MR fluid causes the ferromagnetic particles to align with the orientation of the magnetic field, changing the effective density and viscosity of the MR fluid. In MR damper 100, a magnetic field applied across MR fluid 102 is generated by an electromagnet 107 housed within piston 103, as described in further detail with respect to FIG. 3B. Electromagnet 107 comprises a conductor that is wound into a coil and connected to an external current source (not shown). As described in more detail herein, MR fluid damper 100 eliminates the need for a passive damper to damp the opening stroke of a circuit interrupter or for protrusion 9 to include a latch for keeping separable contacts 4, 5 open due to the movement of piston 103 being dependent upon the ability of MR fluid 102 to pass through channels 106, and represents an improvement to existing circuit interrupter technology.

Figure 3A:
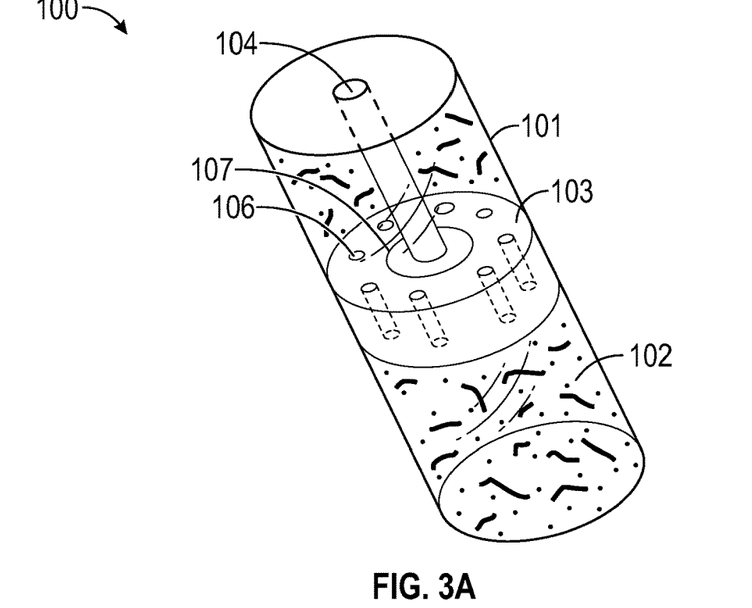
FIG. 3A is a diagram depicting a partial isometric view of the MR fluid damping and latching mechanism shown in FIG. 2 in accordance with an example embodiment of the disclosed concept.
Figure 3B:
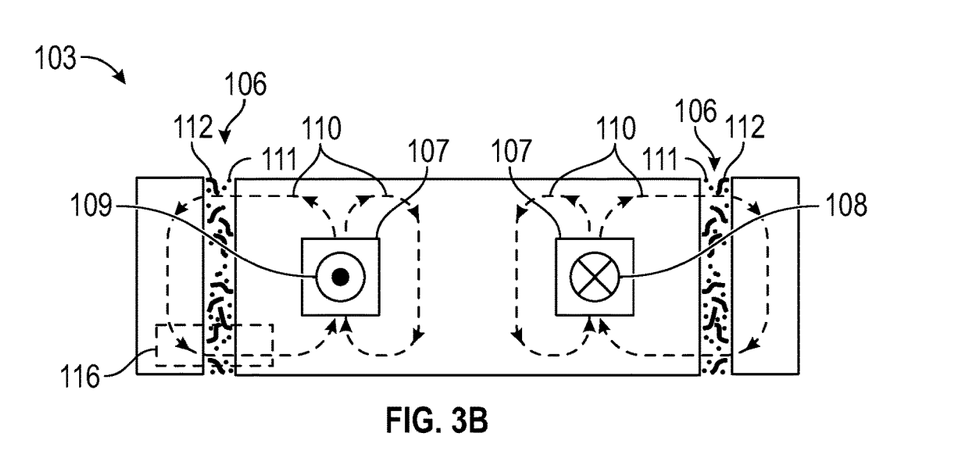
FIG. 3B is a cross-sectional view of a piston depicted in FIGS. 2 and 3A in accordance with an example embodiment of the disclosed concept.
Figure 3C:
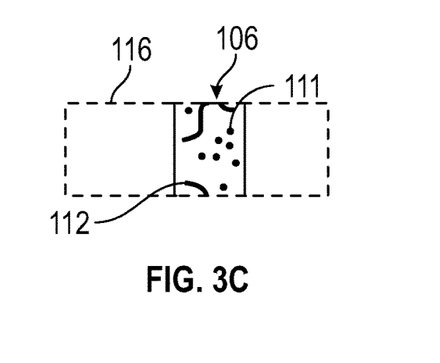
FIG. 3C is a cross-sectional view of a channel in the piston depicted in FIG. 3B containing MR fluid in a minimum viscosity state in accordance with an example embodiment of the disclosed concept.
Figure 3D:
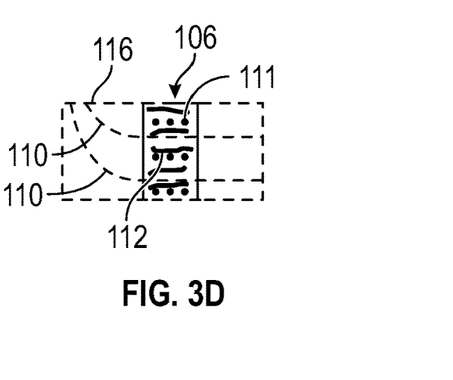
FIG. 3D a cross-sectional view of a channel in the piston depicted in FIG. 3B containing MR fluid in a maximum viscosity state in accordance with an example embodiment of the disclosed concept.

FIG. 3A shows a partial isometric view of a non-limiting embodiment of MR damper 100 wherein housing 101 and piston 103 are cylindrical and the circular bases of the cylindrical forms of housing 101 and piston 103 are disposed at an angle not normal to the viewing plane of FIG. 3A. FIG. 3B shows a cross-sectional view of piston 103 with two channels 106 and magnetic field lines 110 representative of a magnetic field generated when current flows through the conductive coil of electromagnet 107. FIG. 3C depicts an enlarged view of a section 116 of a channel 106 when electromagnet 107 is off such that no current is flowing through electromagnet 107 and electromagnet 107 is not generating a magnetic field. In contrast, FIG. 3D depicts an enlarged view of section 116 of a channel 106 when electromagnet 107 is turned on such that current is flowing through electromagnet 107 and electromagnet 107 is generating a magnetic field. It will be appreciated that the enlarged views of section 116 shown in FIGS. 3C and 3D are representative of the activity occurring throughout the entirety of each channel 106 in piston 103 when electromagnet 107 is turned off and on, respectively.

Referring to FIG. 3C, when electromagnet 107 is turned off such that no current flows through electromagnet 107 (and assuming there is no other magnetic field acting upon MR fluid 102), the ferromagnetic particles 111 of MR fluid 102 are randomly dispersed within the carrier fluid 112 and MR fluid 102 is in its most fluid state. In this maximum fluidity (i.e., minimum viscosity) state, MR fluid 102 can pass through channels 106 with relative ease and piston 103 can accordingly move relatively freely in the axial direction within housing 101. Conversely, referring to FIG. 3D, when electromagnet 107 is turned on and current flows through it in the direction indicated by circled X 108 and circled dot 109 in FIG. 3B (wherein circled X 108 denotes current flowing into the page on which FIG. 3D is drawn and circled dot 109 denotes current flowing out of the page on which FIG. 3D is drawn), a magnetic field oriented in the direction indicated by field lines 110 is generated, in accordance with the right hand rule. As a result of the proximity of the magnetic field represented by field lines 110 to the MR fluid in channels 106, the ferromagnetic particles 111 suspended in MR fluid 102 within each channel 106 align themselves with field lines 110, as shown in FIG. 3D, causing the MR fluid 102 within channels 106 to turn highly viscous. The ferromagnetic particles 111 aligned with field lines 110 block channels 106 and prevent carrier fluid 112 from passing through channels 106, thereby preventing piston 103 from moving axially within housing 101. It will be appreciated that current flowing with the opposite orientation of that shown in FIG. 3B (i.e. with circled X 108 and circled dot 109 switching positions) will produce a magnetic field whose poles are switched with respect to the magnetic field depicted by field lines 110, but whose field lines will maintain the same alignment as field lines 110.

FIG. 3C depicts MR fluid 102 in a maximum fluidity/minimum viscosity state in which piston 103 can move in the axial direction within housing 101 against minimum resistance. Conversely, FIG. 3D depicts MR fluid 102 in a maximum viscosity/minimum fluidity state in which the movement of piston 103 in the axial direction within housing 101 is maximally resisted. A magnetic field such as the one depicted in FIG. 3D that is strong enough to align ferromagnetic particles 111 to completely block channels 106 can be referred to as having a strength greater than or equal to a threshold strength, and the current flowing through electromagnet 107 that produces a magnetic field of threshold strength can be referred to as being of a threshold magnitude. It will be appreciated that, when electromagnet 107 generates a magnetic field of less than threshold strength, i.e. a magnetic field weaker than that which is required to bring MR fluid 102 into the maximum viscosity state depicted in FIG. 3D, the magnetic field only brings ferromagnetic particles 111 into partial alignment with the magnetic field such that MR fluid 102 is in a state of intermediate viscosity. In such an intermediate viscosity/intermediate fluidity state, ferromagnetic particles 111 only partially restrict the movement of carrier fluid 112 through channels 106 without completely blocking channels 106 such that piston 103 can still move in the axial direction within housing 101, but against more resistance than when MR fluid 102 is in the maximum fluidity/minimum viscosity state depicted in FIG. 3C. For a given amount of force applied to piston 103 in the axial direction, piston 103 would travel more slowly in the axial direction within housing 101 through MR fluid 102 in the intermediate viscosity state than in the minimum viscosity state depicted in FIG. 3C.

The viscosity gradient of MR fluid 102 facilitates the use of channels 106 as valves that can be used to actively control the damping of opening strokes of moving assembly 10. When separable contacts 4, 5 are closed, ultrafast opening of separable contacts 4, 5 upon detection of a fault condition is a priority, requiring that MR fluid 102 be in the minimum viscosity state depicted in FIG. 3C so that piston 103 can move downward (with respect to the view shown in FIG. 2) quickly in order to move moving assembly 10 downward (with respect to the view shown in FIG. 2) quickly. In addition to ensuring that MR fluid 102 is in the minimum viscosity state when separable contacts 4, 5 need to open, referring to FIG. 2, in an exemplary embodiment, ultrafast opening of separable contacts 4, 5 can be further facilitated by producing the opening 118 in protrusion 9 to be longer than the portion of opening 118 that is occupied by fastener 105, with the opening 118 only needing to be longer than said portion of opening 118 on the scale of millimeters. Referring to FIG. 2, the portion of fastener 105 inserted within opening 118 is of length B-C, and opening 118 is of length A-C such that opening 118 is longer than the portion of fastener 105 inserted within opening 118 by length A-B. In one non-limiting example, if the portion of fastener 105 inserted into opening 118 measures 4 millimeters (i.e., length B-C is 4 millimeters), then the length of opening 118 can be 6 millimeters (i.e., length A-C is 6 millimeters and length A-B is 2 millimeters). In such an exemplary embodiment, with respect to the view shown in FIG. 2 where separable contacts 4, 5 are closed, length A-B between the top of opening 118 and the top of fastener 105 allows moving assembly 10 to initially move downward a distance of A-B to achieve an ultrafast initial separation of separable contacts 4, 5 upon detection of a fault condition without piston 103 having to move downward. It will be appreciated that, after moving assembly 10 initially moves downward by distance A-B, the top of fastener 105 will abut point A at the top of opening 118 and subsequent downward movement of moving assembly 10 will push against fastener 105 to move MR damper 100 downward. It will also be appreciated that fastener 105 would comprise a sliding fastener in such an exemplary embodiment.

The components of medium and high voltage circuit breakers have a substantial mass and in circuit breakers that use a passive damper, the velocity required to quickly open separable contacts 4, 5 results in moving assembly 10 producing a high impact on any components located underneath moving assembly 10, such as a passive damper. This results in significant wear and tear on all components involved in the impact. The system of the present disclosure, however, damps the high initial opening force of the moving assembly by utilizing the variable viscosity properties of MR fluid 102. After moving assembly 10 has traveled an initial short distance sufficient to separate separable contacts 4, 5 during the initial moments of an opening stroke in which MR fluid 102 is in the minimum viscosity state depicted in FIG. 3C, a processor (not shown) instructs the external current source (not shown) connected to electromagnet 107 to supply a current to electromagnet 107 that generates a magnetic field strong enough to bring MR fluid 102 into the intermediate viscosity state by partially aligning ferromagnetic particles 111 with the generated magnetic field. The transition to the intermediate viscosity state from the minimum viscosity state slows the axial movement of piston 103 within housing 101, and the processor can subsequently increase the magnitude of the current supplied to electromagnet 107 to increase the strength of the magnetic field generated by electromagnet 107 to bring MR fluid 102 into the maximum viscosity state depicted in FIG. 3D to stop the axial movement of piston 103 altogether. The maximum viscosity state depicted in FIG. 3D eliminates the need for a mechanical latch that is typically used in circuit breakers to maintain separable contacts 4, 5 in the open state, as the high viscosity of MR fluid 102 latches moving assembly 10, i.e., holds moving assembly 10 in place, until the fault condition is cleared and the separable contacts 4, 5 can be reclosed. When it is time to reclose the separable contacts, the viscosity of MR fluid 102 can be reduced by reducing the amount of current supplied to electromagnet 107 in order to permit moving assembly 10 to move toward fixed stem 3 and separable contact 5.

Damping and latching of Thomson coil actuator 1 can be actively controlled in several additional ways by electrically driving the formation and strength of the magnetic field in MR fluid 102. In a first non-limiting example, the power, voltage, and/or current that activates electromagnet 107 can be supplied in the form of a pulse or can be pulse width modulated (PWM). High response speed and fidelity of MR damper 100 and Thomson coil actuator 1 during damping and latching functions can be achieved by adjusting the duration and/or amplitude of pulsed power or the duty cycle of PWM power supplied to electromagnet 107, as such adjustments effect precise changes in the strength of the magnetic field generated by electromagnet 107. For example, latching of Thomson coil actuator 1 for a predetermined duration can be achieved by supplying PWM power to electromagnet 107 and choosing a duty cycle that will generate a proper holding force from MR fluid 102 for the predetermined duration. In another non-limiting example, electromagnet 107 can be preemptively activated prior to the damping of Thomson coil actuator 1 being desired in order to allow any mechanical or electrical hysterias and backlashes that occur when electromagnet 107 is activated to resolve before damping is desired. It is suggested that activating electromagnet 107 anywhere from 0 milliseconds to a couple of milliseconds before damping is desired results in an optimal response time from MR damper 100 at such time when damping is desired, however, the exact timing of when electromagnet 107 would need to be activated to achieve an optimal response time in a given circuit interrupter would depend on the mechanics of the particular Thomson coil actuator 1 and MR damper 100 employed by the circuit breaker. Active control of the damping and latching functions described herein can be optimized by programming the processor (not shown) that supplies power to coil 12 and electromagnet 107 to continually evaluate the position and motion of Thomson coil actuator 1 using a closed loop evaluation function.

While MR damper 100 is depicted and described in the context of damping the movement of a moving assembly in a circuit breaker that uses a Thomson coil actuator to open and close its separable contacts such as moving assembly 10, it will be appreciated that MR damper 100 can be used with a circuit interrupter in a circuit breaker that uses non-coil-based actuator to open and close its separable contacts without departing from the scope of the disclosed concept.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof

What is claimed is:

1. A damping and latching mechanism for use with a movable separable contact of a circuit interrupter, the damping and latching mechanism comprising:
   a housing;
   magnetorheological (MR) fluid contained within the housing, the MR fluid comprising:
      ferromagnetic particles; and
      carrier fluid;
   a piston disposed within the housing such that the piston is immersed in the MR fluid, the piston being structured to fit snugly within the housing and move within the housing, the piston comprising:
      a number of channels through which the MR fluid can pass; and
      an electromagnet electrically connected to a current source; and
   a connecting rod coupled at a first end to the piston and structured to couple the piston to the moving separable contact at a second end of the connecting rod,
   wherein supplying current from the current source to the electromagnet produces a magnetic field within the number of channels in the piston, and
   wherein changing the magnetic field changes the viscosity of the MR fluid.

2. The damping and latching mechanism of claim 1, wherein current supplied to the electromagnet is supplied as one of a pulsed current or a pulse width modulated (PWM) current.

3. The damping and latching mechanism of claim 1,
   wherein the movable separable contact is structured to move between a closed position and an open position,
   wherein the closed position is a position in which the movable separable contact is electrically connected to a second separable contact of the circuit interrupter, and
   wherein the open position is a position in which the movable separable contact is electrically isolated from the second separable contact.

4. The damping and latching mechanism of claim 3,
   wherein the movable separable contact can move between the closed position and open position only when the MR fluid can pass through the number of channels, and
   wherein, if the electromagnet produces a magnetic field of a threshold strength, the ferromagnetic particles align in the number of channels and prevent the MR fluid from passing through the number of channels.

5. The damping and latching mechanism of claim 1,
   wherein the MR fluid is in a minimum viscosity state when no current is flowing through the electromagnet,
   wherein, in the minimum viscosity state, the MR fluid can pass through the number of channels with no restriction and the piston can move within the housing,
   wherein the MR fluid is in a maximum viscosity state if current of a threshold magnitude is flowing through the electromagnet to produce a magnetic field of a threshold strength, and
   wherein, in the maximum viscosity state, the ferromagnetic particles align to completely block the number of channels and prevent the carrier fluid from passing through the number of channels such that the piston cannot move within the housing.

6. The damping and latching mechanism of claim 5,
   wherein the MR fluid is in an intermediate viscosity state if current less than the threshold magnitude is flowing through the electromagnet to produce a magnetic field with less than the threshold strength, and
   wherein, in the intermediate viscosity state, the ferromagnetic particles partially align to partially restrict movement of the carrier fluid through the number of channels such that the piston can move within the housing at a slower speed than in the minimum viscosity state.

7. The damping and latching mechanism of claim 6,
   wherein the movable separable contact is structured to move between a closed position and an open position, wherein the closed position is a position in which the movable separable contact is electrically connected to a second separable contact of the circuit interrupter, and wherein the open position is a position in which the movable separable contact is electrically isolated from the second separable contact.

8. The damping and latching mechanism of claim 7, wherein the maximum viscosity state is used to maintain the movable separable contact in the open position.

9. The damping and latching mechanism of claim 7, wherein the minimum viscosity state is used when movement from one of the closed position and the open position to the other of the closed position and the open position is initiated.

10. A circuit breaker comprising:
a circuit interrupter comprising a movable separable contact and a second separable contact;
an actuator configured to move the movable separable contact; and
a damping and latching mechanism, the damping and latching mechanism comprising:
  a housing;
  magnetorheological (MR) fluid contained within the housing, the MR fluid comprising:
    ferromagnetic particles; and
    carrier fluid;
  a piston disposed within the housing such that the piston is immersed in the MR fluid, the piston being structured to fit snugly within the housing and move within the housing, the piston comprising:
    a number of channels through which the MR fluid can pass; and
    an electromagnet electrically connected to a current source; and
  a connecting rod coupled at a first end to the piston and structured to couple the piston to the moving separable contact at a second end of the connecting rod,
wherein supplying current from the current source to the electromagnet produces a magnetic field within the number of channels in the piston, and
wherein changing the magnetic field changes the viscosity of the MR fluid.

11. The circuit breaker of claim 10, wherein current supplied to the electromagnet is supplied as one of a pulsed current or a pulse width modulated (PWM) current.

12. The circuit breaker of claim 10, wherein the current source is configured to supply current to the electromagnet a predetermined amount of time before damping of movement of the movable separable contact is initiated.

13. The circuit breaker of claim 10,
wherein the movable separable contact is structured to move between a closed position and an open position,
wherein the closed position is a position in which the movable separable contact is electrically connected to the second separable contact of the circuit interrupter, and
wherein the open position is a position in which the movable separable contact is electrically isolated from the second separable contact.

14. The circuit breaker of claim 13,
wherein the movable separable contact can move between the closed position and open position only when the MR fluid can pass through the number of channels, and
wherein, if the electromagnet produces a magnetic field of a threshold strength, the ferromagnetic particles align in the number of channels and prevent the MR fluid from passing through the number of channels.

15. The circuit breaker of claim 13, further comprising:
an actuator shaft coupled at a first end to the movable separable contact and comprising an opening at a second end; and
a fastener structured to couple the connecting rod to the opening,
wherein the second end of the connecting rod is coupled to the opening by inserting the fastener into the opening,
wherein a total length of the opening is greater than a length of a portion of the opening that is occupied by the fastener, and
wherein, after the actuator initiates movement of the movable separable contact from the closed position to the open position, the movable separable contact moves a distance equal to the difference between the total length of the opening and the length of the portion of the opening that is occupied by the fastener before the piston moves within the housing.

16. The circuit breaker of claim 10,
wherein the MR fluid is in a minimum viscosity state when no current is flowing through the electromagnet,
wherein, in the minimum viscosity state, the MR fluid can pass through the number of channels with no restriction and the piston can move within the housing,
wherein the MR fluid is in a maximum viscosity state if current of a threshold magnitude is flowing through the electromagnet to produce a magnetic field of a threshold strength, and
wherein, in the maximum viscosity state, the ferromagnetic particles align to completely block the number of channels and prevent the carrier fluid from passing through the number of channels such that the piston cannot move within the housing.

17. The circuit breaker of claim 16,
wherein the MR fluid is in an intermediate viscosity state if current less than the threshold magnitude is flowing through the electromagnet to produce a magnetic field with less than the threshold strength, and
wherein, in the intermediate viscosity state, the ferromagnetic particles partially align to partially restrict movement of the carrier fluid through the number of channels such that the piston can move within the housing at a slower speed than in the minimum viscosity state.

18. The circuit breaker of claim 17,
wherein the movable separable contact is structured to move between a closed position and an open position,
wherein the closed position is a position in which the movable separable contact is electrically connected to a second separable contact of the circuit interrupter, and
wherein the open position is a position in which the movable separable contact is electrically isolated from the second separable contact.

19. The circuit breaker of claim 18,
wherein the maximum viscosity state is used to maintain the movable separable contact in the open position, and
wherein the minimum viscosity state is used when movement from one of the closed position and the open position to the other of the closed position and the open position is initiated.

20. The circuit breaker of claim 19, further comprising:
an actuator shaft coupled at a first end to the movable separable contact and comprising an opening at a second end; and
a fastener structured to couple the connecting rod to the opening, wherein the second end of the connecting rod is coupled to the opening by inserting the fastener into the opening, wherein a total length of the opening is greater than a length of a portion of the opening that is occupied by the fastener, and wherein, after the actuator initiates movement of the movable separable contact from the closed position to the open position, the movable separable contact moves a distance equal to the difference between the total length of the opening and the length of the portion of the opening that is occupied by the fastener before the piston moves within the housing.

* * * * *